(12) United States Patent
Beers

(10) Patent No.: US 6,390,164 B1
(45) Date of Patent: May 21, 2002

(54) TIRE WITH INNERLINER FOR PREVENTION OF AIR PERMEATION

(75) Inventor: Roger Neil Beers, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/401,438

(22) Filed: Sep. 22, 1999

(51) Int. Cl.$^7$ .................................................. B60C 19/12
(52) U.S. Cl. .............................. 152/510; 152/DIG. 16; 524/47; 524/495
(58) Field of Search .................... 152/510, 511; 524/47, 52, 495, 571, 569, 574, 567

(56) References Cited

U.S. PATENT DOCUMENTS

| | | | | |
|---|---|---|---|---|
| 3,769,122 A | * | 10/1973 | Coddington et al. | ........ 156/115 |
| 4,254,240 A | * | 3/1981 | Newman et al. | ............. 525/356 |
| 5,672,639 A | * | 9/1997 | Corvasce et al. | .............. 524/52 |
| 5,922,153 A | * | 7/1999 | Beers et al. | ................. 152/510 |
| 6,009,923 A | * | 1/2000 | Hergenrother et al. | ...... 152/510 |
| 6,096,248 A | * | 8/2000 | Fraser et al. | ................... 264/39 |
| 6,202,726 B1 | * | 3/2001 | Corvasce et al. | ........... 152/517 |

* cited by examiner

Primary Examiner—Edward J. Cain
Assistant Examiner—Katarzyna W. Lee
(74) Attorney, Agent, or Firm—Henry C. Young, Jr.

(57) ABSTRACT

The present invention relates to a pneumatic tire having a layer, preferably an innerliner, for prevention, or retardation, of air permeation from its inner chamber into the remainder of the tire. The innerliner is of a butyl rubber composition which contains a dispersion of starch/plasticizer composite.

1 Claim, No Drawings

TIRE WITH INNERLINER FOR PREVENTION OF AIR PERMEATION

FIELD

The present invention relates to a pneumatic tire having a layer, preferably an innerliner, for prevention, or retardation, of air permeation from its inner chamber into the remainder of the tire. The innerliner is of a butyl rubber composition which contains a dispersion of a starch/plasticizer composite.

BACKGROUND

A pneumatic rubber tire is conventionally of a toroidal shape and comprised of a carcass with a cavity in which its closure is typically completed with a rigid rim onto which the tire is to be mounted. Such pneumatic tire and pneumatic tire/rim assembly is well known.

The inner surface of a pneumatic tire, namely a surface of said cavity which is sometimes referred to as an "innerliner" is typically composed of an elastomeric composition designed to prevent, or retard, the permeation of air and moisture into the tire carcass from the aforesaid cavity which becomes the tire's inner air chamber. Such tire innerliners are well to those having skill in such art.

Butyl rubber is typically relatively impermeable to air and moisture and is often used as a major portion of the tire innerliner composition and can be in a form of butyl rubber or halobutyl rubber such as, for example, bromobutyl rubber. For example, see U.S. Pat. No. 3,808,177. Butyl rubber, while containing a minor amount of units derived from a diene such as, for example isoprene, is not considered herein as being a diene-based rubber since it contains less than 15 percent of its content derived form a diene monomer and, therefore, sulfur vulcanizes at a much slower rate than diene-based elastomers which contain at least, for example, 30 percent of their elastomer content derived from diene monomers. Such innerliner concept is well known to those skilled in such art.

Accordingly, it is sometimes desired to enhance, or reduce, an already low air permeability of a carbon black reinforced butyl rubber and particularly a halobutyl rubber based tire innerliner.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber" and "rubber compound", where used herein, are used interchangeably to refer to "rubber which has been blended or mixed with various ingredients and materials" and such terms are well known to those having skill in the rubber mixing or rubber compounding art.

The term "carbon black" as used herein means "carbon blacks having properties typically used in the reinforcement of elastomers, particularly sulfur-curable elastomers".

A reference to an elastomer's Tg refers to its glass transition temperature which can conveniently be determined by a differential scanning calorimeter at a heating rate of 10° C. per minute.

SUMMARY AND PRACTICE OF THE INVENTION

In accordance with one aspect of this invention, a pneumatic tire is provided which contains an air permeation prevention layer (innerliner) comprised of, based upon 100 parts by weight of rubber (phr), 100 parts by weight of at least one rubber selected from butyl rubber and halobutyl rubber having a dispersion therein comprised of (A) from about 30 to about 70, alternately about 40 to about 60 phr of carbon black and (B) about 5 to about 30, alternately about 10 to about 20, phr of a starch/plasticizer composite; wherein said starch composite is comprised of starch and a plasticizer for said starch; wherein said starch is composed of amylose units to amylopectin units in a ratio of about 15/85 to about 100/0, alternately about 20/80 to about 80/20; where said starch has a softening point according to ASTM No. D1228 in a range of about 180° C. to about 220° C.; wherein said starch/plasticizer composite has a softening point in a range of about 110° C. to about 170° C. according to ASTM No. D1228 and, wherein the starch/plasticizer weight ratio is in a range of about 0.4/1 to about 5/1, alternately about 1/1 to about 3/1, so long as the softening point thereof is in a range of about 110° C. to about 170° C.

Preferably, said innerliner has a thickness in a range of about 2.5 to about 6 mm.

A significant aspect of the invention is the use of a dispersion within the carbon black reinforced butyl rubber, or halobutyl rubber, of a particulate starch/plasticizer composite.

It is considered herein that the addition of the dispersion of the starch/plasticizer composite can act to enhance, or reduce, the already low air permeability of the butyl rubber-based composition.

Therefore, it is also considered herein that a new, novel, integral tire innerliner is provided which also has a relatively low air permeability property.

This is considered to be a significant departure from past practice of simply providing carbon black reinforced butyl and halobutyl rubber-based tire innerliners.

In practice, it is considered herein that starch has too high of a softening point (e.g.: at least 180° C. and usually at least 200° C. and higher) to be useful for very many elastomer formulations for tires.

Starch/plasticizer composites with a lower softening point have a greater potential for use in such circumstances for creating a dispersion within the carbon black reinforced butyl or halobutyl rubber-based tire innerliner.

U.S. Pat. Nos. 5, 672,639, 5,403,923, 5,258,430, and 4,900,361 disclose the preparation and use of various starch compositions including use thereof for various tire components.

Starch is understood herein to be a composition which might be represented as a carbohydrate polymer having repeating units of amylose (anhydroglucopyranose units joined by glucosidic bonds) and usually amylopectin, a branched chain structure, as is well known to those having skill in such art. Typically, starch is composed of about 25 percent amylose and about 75 percent amylopectin. (*The Condensed Chemical Dictionary*, Ninth Edition (1977), revised by G. G. Hawley, published by Van Nostrand Reinhold Company, page 813). Starch can be, reportedly, a reserve polysaccharide in plants such as, for example, corn (e.g.: corn starch), potatoes, rice and wheat as typical commercial sources.

It is considered herein that a development of a starch/plasticizer composition, or compositions, with a softening point significantly lower than that of the starch alone, allows the starch to be more easily mixed and processed in conventional elastomer processing equipment.

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

In one aspect, a lowering of a softening point for the starch may be the use of, for example, a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolyzed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, as hereinbefore related, the starch/plasticizer composite has a desired starch to plasticizer weight ratio in a range of about 0.4/1 to about 5/1, alternately about 1/1 to about 3/1, so long as the starch/plasticizer composition has the required softening point range, and preferably, is capable of being a free flowing, dry powder or extruded pellets, before it is mixed with the elastomer(s).

While the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

In practice, the said starch/synthetic plasticizer composite may typically have a moisture content in a range of about zero to about 30, alternatively about one to about six, weight percent.

The starch, as hereinbefore discussed, is understood to be typically composed of amylose units and/or amylopectin units. These are well known components of starch. Typically, it is understood herein that the starch is composed of a combination of the amylose and amylopectin units in a ratio of about 25/75, also the starch may be composed entirely of amylose units. A somewhat broader range of ratios of amylose to amylopectin units is recited herein in order to provide a starch for the starch composite which interact with the plasticizer somewhat differently. For example, it is considered herein that suitable ratios may be from about 20/80 up to 100/0, although a more suitable range is considered to be about 15/85 to about 35/63.

The starch can typically be obtained from naturally occurring plants as hereinbefore referenced. The starch/plasticizer composition can be present in various particulate forms such as, for example, fibrils, spheres or macromolecules, which may, in one aspect, depend somewhat upon the ratio of amylose to amylopectin in the starch as well as the plasticizer content in the composite.

The relative importance, if any, of such forms of the starch is the difference in their reinforcing associated with the filler morphology. The morphology of the filler primarily determines the final shape of the starch composite within the elastomer composition, in addition, the severity of the mixing conditions such as high shear and elevated temperature can allow to optimize the final filler morphology. Thus, the starch composite, after mixing, may be in a shape of one or more of hereinbefore described forms.

It is important to appreciate that the starch, by itself, is hydrophilic in nature, meaning that it has a strong tendency to bind or absorb water. Thus, the moisture content for the starch and/or starch composite has been previously discussed herein. This is considered to be an important, or desirable, feature in the practice of this invention because water can also act somewhat as a plasticizer with the starch and which can sometimes associate with the plasticizer itself for the starch composite such as polyvinyl alcohol and cellulose acetate, or other plasticizer which contain similar functionalities such as esters of polyvinyl alcohol and/or cellulose acetate or any plasticizer which can depress the melting point of the starch.

Various grades of the starch/plasticizer composition can be developed to be used with various elastomer compositions and processing conditions.

As hereinbefore pointed out, the starch is understood to typically have a softening point of at least 180° C., usually at least 200° C. For example, it may have a softening point in a range of about 200° C. to about 220° C., depending somewhat upon its ratio of amylose to amylopectin units, as well as other factors and, thus, does not readily soften when the rubber is conventionally mixed, for example, at a temperature in a range of about 140° C. to about 165° C. Accordingly, after the rubber is mixed, the starch remains in a solid particulate form, although it may become somewhat elongated under the higher shear forces generated while the rubber is being mixed with its compounding ingredients. Thus, the starch remains largely incompatible with the rubber and is typically present in the rubber composition in individual domains.

However, it is now considered herein that providing starch in a form of a starch composite of starch and a plasticizer is particularly beneficial in providing such a composition with a softening point in a range of about 110° C. to about 160° C.

The plasticizers can typically be combined with the starch such as, for example, by appropriate physical mixing processes, particularly mixing processes that provide adequate shear force.

The combination of starch and, for example, polyvinyl alcohol or cellulose acetate, is referred to herein as a "composite". Although the exact mechanism may not be completely understood, it is believed that the combination is not a simple mixture but is a result of chemical and/or physical interactions. It is believed that the interactions lead to a configuration where the starch molecules interact via the amylose with the vinyl alcohol, for example, of the plasticizer molecule to form complexes, involving perhaps chain entanglements. The large individual amylose molecules are believed to be interconnected at several points per molecule with the individual amylopectine molecules as a result of hydrogen bonding (which might otherwise also be in the nature of hydrophilic interactions).

This is considered herein to be beneficial because, by varying the content and/or ratios of natural and synthetic components of the starch composite, it is believed to be possible to alter the balance between hydrophobic and hydrophilic interactions between the starch components and the plasticizer to allow, for example, the starch composite filler to vary in form from spherical particles to fibrils.

The following example is provided for a further understanding of the invention and is not intended to be limiting. The parts and percentages are be weight unless otherwise specified.

EXAMPLE I

Carbon black reinforced halobutyl, particularly bromobutyl, rubber compositions are prepared including such compositions which contain a starch/plasticizer composite.

The compositions are referred to herein as Samples A–C, with Sample A being a Control which contains a dispersion of carbon black reinforcement and Samples B–C also contain a dispersion of starch/plasticizer composite.

In particular, the rubber composition are prepared by mixing the ingredients in an internal rubber mixer under high shear mixing conditions in at least one preparatory (non-productive) mixing stage(s) without free sulfur and accelerator curatives for about four minutes at a temperature of about 150° C.

Subsequently, and in final internal rubber mixing stage (productive mixing stage), sulfur and accelerator curatives are mixed with the rubber mixture for about two minutes at a temperature of about 100° C.

The method of preparing rubber compositions via a sequential series of one or more non-productive mixing stages followed by a final productive mixing stage is well known to those skilled in such art.

In practice, it is considered herein that the starch/plasticizer composite tends to melt, form a liquid and become somewhat homogeneously mixed with the rubber composition beginning at about 130° C. during the mixing stage as the temperature of the mixture autogeneously increases to the aforesaid 150° C.

Formulations for Samples A–C are shown in the following Table 1.

TABLE 1

| Ingredient | Sample A Control | Sample B | Sample C |
|---|---|---|---|
| Non-Productive Mixing | | | |
| Butyl rubber[1] | 10 | 10 | 10 |
| bromobutyl rubber[2] | 90 | 90 | 90 |
| Carbon black[3] | 60 | 60 | 40 |
| Zinc oxide | 1 | 1 | 1 |
| Fatty acid[4] | 1 | 1 | 1 |
| Starch/plasticizer composite[5] | 0 | 10 | 20 |
| Productive Mixing | | | |
| Sulfur | 0.5 | 0.5 | 0.5 |
| Accelerator(s)[6] | 1.5 | 1.5 | 1.5 |

[1]A butyl rubber obtained as Butyl 268 from the Exxon company.
[2]A bromobutyl rubber obtained as MDB2222 rubber from the Exxon company.
[3]N660 carbon black, an ASTM designation.
[4]Primarily, stearic acid.
[5]The starch/plasticizer composite is composed of starch and poly (ethylenevinyl alcohol) plasticizer in a weight ratio of about 1.5/1 and having a softening point according to ASTM No. D1228 of about 147° C.; wherein the starch is composed of amylose units and amylopectin units in a weight ratio of about 1/3 and a moisture content of about 5 weight percent as Mater Bi 1128R from the Novamont company.
[6]Sulfur vulcanization accelerator as mercaptobenzothiazole and tetramethylthiuramdisulfide.

The Samples were cured at a temperature of about 150° C. for about 36 minutes.

Physical properties of the cures Samples are shown in the following Table 2.

TABLE 2

| Test/Property | Sample A Control | Sample B | Sample C |
|---|---|---|---|
| Tensile strength, MPa | 8.2 | 7.4 | 7.8 |
| Elongation, % | 966 | 844 | 783 |
| Modulus, 100%, MPa | 1.0 | 1.2 | 1.3 |
| Air permeability[1] | 135 | 121 | 107 |

[1]Air permeability test conducted according to ASTM No. D1434.

It is readily seen from Table 2 that air permeability is reduced in Sample B and more so in Sample C, as compared to Control Sample A, by the addition of the starch/plasticizer composite.

This is considered herein to be significant because the rubber compositions of Samples B and C exhibited an air permeability reduction of more than ten percent by an addition of 10 phr of the starch/plasticizer composite and by more than 20 percent upon addition of 20 phr of the starch/plasticizer composite.

It is also readily seen from Table 2 that tensile strength and modulus physical properties of Samples B and C were not significantly changed as compared those of the Control Sample A.

This is also considered herein to be significant because the Samples B and C represent improved tire innerliner air barrier materials without a loss in strength or elongation properties.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a carbon black reinforced, butyl rubber based innerliner, wherein said innerliner is comprised of, based upon 100 parts by weight rubber (phr), 100 parts by weight of at least one rubber selected from butyl rubber as a copolymer of isobutylene and about 2 to about 10 weight percent isoprene, or halobutyl rubber as said butyl rubber having been brominated, wherein said butyl rubber based innerliner has a dispersion therein comprised of (A) reinforcement consisting of from about 30 to about 70 phr of carbon black and (B) about 5 to about 30 phr of a starch/plasticizer composite;

wherein said starch composite is comprised of starch and a plasticizer for said starch;

wherein said starch is composed of amylose units and amylopectin units in a ratio of about 15/85 to about 100/0;

wherein said starch has a softening point according to ASTM No. D1228 in a range of about 180° C. to about 220° C.;

wherein said starch/plasticizer composite has a softening point in a range of about 110° C. to about 170° C. according to ASTM No. D1228, wherein the starch to plasticizer weight ratio is in a range of about 0.4/1 to about 5/1 so long as the softening point of said composite is in a range of about 110° C. to about 170° C., and wherein, for said starch/plasticizer composite, said plasticizer is a liquid at 23° C. and is at least one of poly(ethylenevinyl alcohol), cellulose acetate, hydrolyzed ethylene-vinyl acetate copolymers having a vinyl acetate molar content of from about 5 to about 90 percent, ethylene glycidal acrylate copolymers or ethylene-maleic anyhdride copolymers or mixtures thereof.

* * * * *